United States Patent

Gagnot et al.

[11] Patent Number: 6,002,212
[45] Date of Patent: *Dec. 14, 1999

[54] METHOD AND DEVICE FOR DRIVING A RADIATION EMITTING DEVICE

[75] Inventors: Dominique Gagnot, Rosheim; Marc Amstoutz, Strasbourg; Eric Diehl, Chantepie, all of France

[73] Assignee: Thomson multimedia S.A., Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 08/682,576
[22] PCT Filed: Feb. 2, 1995
[86] PCT No.: PCT/EP95/00372
 § 371 Date: Nov. 12, 1996
 § 102(e) Date: Nov. 12, 1996
[87] PCT Pub. No.: WO95/22211
 PCT Pub. Date: Aug. 17, 1995

[30] Foreign Application Priority Data

Feb. 11, 1994 [EP] European Pat. Off. ............... 94400309

[51] Int. Cl.$^6$ ....................................... G05F 1/00
[52] U.S. Cl. ................... 315/291; 315/163; 315/169.3; 372/28; 372/38
[58] Field of Search .................... 315/163, 166, 315/169.3, 291, 307; 372/26, 28, 29, 32, 38

[56] References Cited

U.S. PATENT DOCUMENTS

| | | | |
|---|---|---|---|
| 4,488,305 | 12/1984 | Claverie et al. | 372/38 |
| 4,577,320 | 3/1986 | Yoshikawa et al. | 372/29 |
| 4,817,097 | 3/1989 | Dufour | 372/25 |
| 5,099,193 | 3/1992 | Moseley et al. | 323/324 |

FOREIGN PATENT DOCUMENTS 3817621  11/1989  Germany .

OTHER PUBLICATIONS

*Patent Abstracts of Japan, vol. 12, No. 207, 1988 and Japan Pt. 63–004726 (Mitsubishi).

**Patent Abstracts of Japan, vol. 10, No. 39, 1986 and Japan Pt. 60–194846.

*Primary Examiner*—Haissa Philogene
*Attorney, Agent, or Firm*—Joseph S. Tripoli; Peter M. Emanuel; Frederick A. Wein

[57] ABSTRACT

A radiation emitting device, such as an LED, is optimally driven in dependence on the value of a carrier frequency of a signal to be transmitted. The current provided to the radiation emitting element is controlled responsive to the carrier frequency. When using an LED, the current value is increased with decreasing duration of current flow. The apparatus is usable for remote controls suitable for controlling two or more devices.

10 Claims, 2 Drawing Sheets

METHOD AND DEVICE FOR DRIVING A RADIATION EMITTING DEVICE

BACKGROUND

The present invention relates to a method and an according device for driving a radiation emitting device, such as light emitting diode (LED) which is to be used for a wide range of modulation frequency.

LEDs are generally known. These kind of diodes transmit electromagnetical radiation with a given wavelength (or colour), which depends on physical characteristics of the LED. Commonly known LEDs transmit light with e.g. red, green, yellow colour or infrared (IR) radiation. LEDs transmitting visible light can be used for for displaying information, such as a process parameter of a device, to a user.

In addition to this, all kinds of LEDs can be used for a system including a light transmitter and a light receiver. Such systems can also use a light wave conductor and can be used for the transmission of audio-, video- and/or data-information. A preferred application for such a system is a infrared- (IR-) remote control for any kind of devices, such as TV-sets, audio-receivers, videotape-recorders, etc. For transmitting the mentioned information it is necessary to modulate the radiation transmitted by the LED. This can be done e.g with the aid of a pulsed modulation wherein during the duration of a pulse the transmitted radiation is switched on and off with a given modulation frequency, which is called in the further description carrier frequency.

Known IR-remote control systems work in a wide range of carrier frequencies, normally from 30 kHz up to 500 kHz. Often a remote control transmitter is used just for the control of a single device, and thereby it works either in the carrier frequency range of —30 to 40 kHz, or —390 to 500 kHz.

From EP 289 625 B1 there is a remote commander known which can be used for controlling a number of devices by learning commands from other remote commanders.

From the elder (not yet published) German patent application P 43 08 441.9 is a learning remote commander known, which can be used for different kinds of carrier frequencies and which is also able to consider the presence of so-called togglebits.

We have found out that there occur problems, if a remote commander of the type mentioned includes just a single radiation emitting element, such as a LED, or a number of such elements which are driven simultaneously.

It is an object of the present invention to solve the above mentioned problem.

SUMMARY OF THE INVENTION

The basic idea of the present invention is, that for a "low" carrier frequency, e.g. lower than 50 kHz, a lower current is necessary for the same radiation intensity, as for a "high" carrier frequency, e.g. higher than 300 kHz. This means that a high current is sent through the LED during a short period of time and that a low current is sent through the LED for a long period. Thereby it is possible to avoid the destruction of the LED but having always a high efficiency.

According to the present invention the value of a current with which a single radiation emitting element, such as a LED, or a group of such elements, is driven depends on the carrier frequency of the transmitted signal. It is preferred to increase the current-value for higher carrier frequencies.

For the realization of a remote controller which is usable for a given distance, a minimum radiation intensity of the LED is necessary. That means, known systems, which drive the LED with the same current independent from the carrier frequency, must provide quite a high current to get over a given distance as well for a low carrier frequency as for a higher carrier frequency. This means that known systems use for the lower frequency a current which is higher than necessary. Contrarily to this the invention has the advantages that the life time of the driven radiation emitting element is increased and that power consumption of the remote commander is decreased which means that life time of a used battery is increased.

Further details, characteristics and advantages of the invention will be explained with the aid of the drawing in the following description of preferred embodiments. Therein

BRIEF DESCRIPTION OF THE DRAWING(S)

DESCRIPTION OF THE PREFERRED EMBODIMENT

Prior to the further description of the embodiments it may be mentioned that the blocks shown in the figures just serve for a better understanding of the invention. Normally some of these blocks are integrated to units. These can be realized e.g. as integrated circuit, hybrid circuit or as programcontrolled microcomputer or as part of a program usable for controlling said computer.

The elements included inside the shown stages can also be realized separately.

Figure 1:
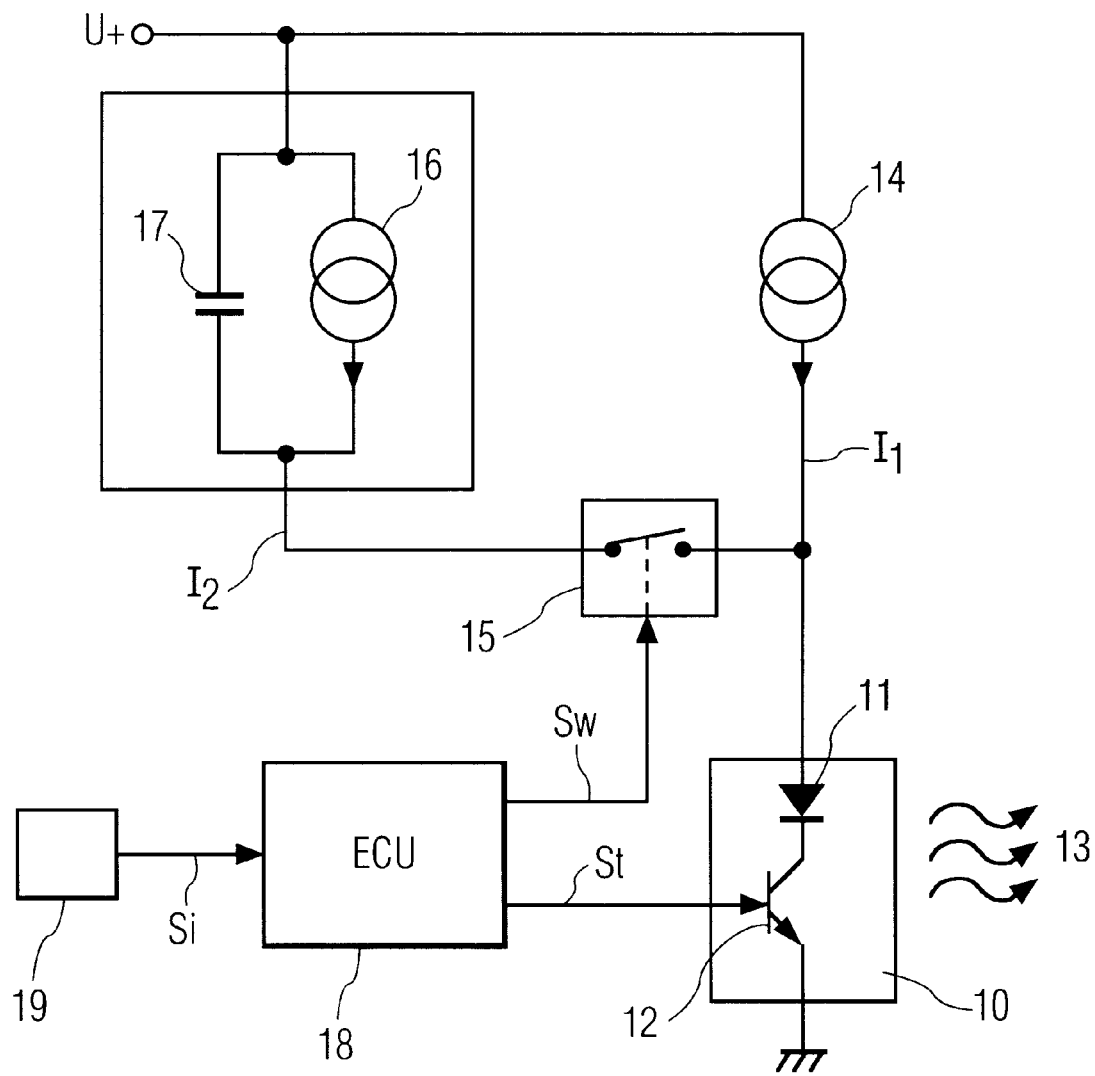
FIG. 1 shows a block diagram of a preferred embodiment.

FIG. 1 shows a block diagram of a remote control commander with an emitter stage 10 including one or more LEDs 11 and according switching elements 12, in this embodiment realized as transistor, wherein the stage 10 is suitable to transmit electromagnetic radiation 13, such as visible light, infrared (IR) light or so. The anode of LED 11 is connected with the output of a first current source 14 and with a first switching terminal of a switch 15. A second switching terminal of switch 15 is connected with the output of a second current source 16 and with a first terminal of a capacitor 17. The inputs of the current sources 14, 16 and the second terminal of the capacitor 17 are connected with a positive voltage U+. The control input of switch 15 receives switch-control signals Sw from an electronic control unit (ECU) 18, which is connected via another line with the base of transistor 12, or more generally spoken with a control input of the switching element of emitter stage 10, and sends transmitter control signals St for controlling the modulation of the radiation 13. The control signals Sw and St depend on input orders Si, which can be given by a user with the aid of an input unit 19.

The remote commander of FIG. 1 may be able to control one or more devices, wherein the modulation of the radiation 13 has different carrier frequencies, e.g. a first one in the range of about 40 kHz and a second one in the range of about 400 kHz.

When the user gives a control command, the ECU 18 translates the signal Si into an according modulation and knows thereby the right carrier frequency. If it deals with a low frequency value, e.g. 40 kHz, the signal Sw controls the switch 15 such that it is open and that only a current I1, which has a value of about 0.1 A in a preferred embodiment, is delivered from the first current source 14 is provided to the emitter stage 10.

If the command given by the user requires a high carrier frequency, e.g. 390 kHz, the switch 15 will be closed with the aid of the signal Sw and in addition to the current I1 of the first source 14, also a current I2 delivered by the second source 16 and by the capacitor 17 are provided to the emitter stage 10.

The combination of the second source 16 together with the capacitor 17 is very advantageous as a relative high current I2 can be provided to the stage 10 with a relative small current source 16. For that it should be kept in mind that the duration of a single transmission of the modulated radiation 13 is short and that the time between two transmissions is sufficient to charge the capacitor 17 by the source 16. The capacitor 17 and the source 16 must be proportioned accordingly.

Figure 2:
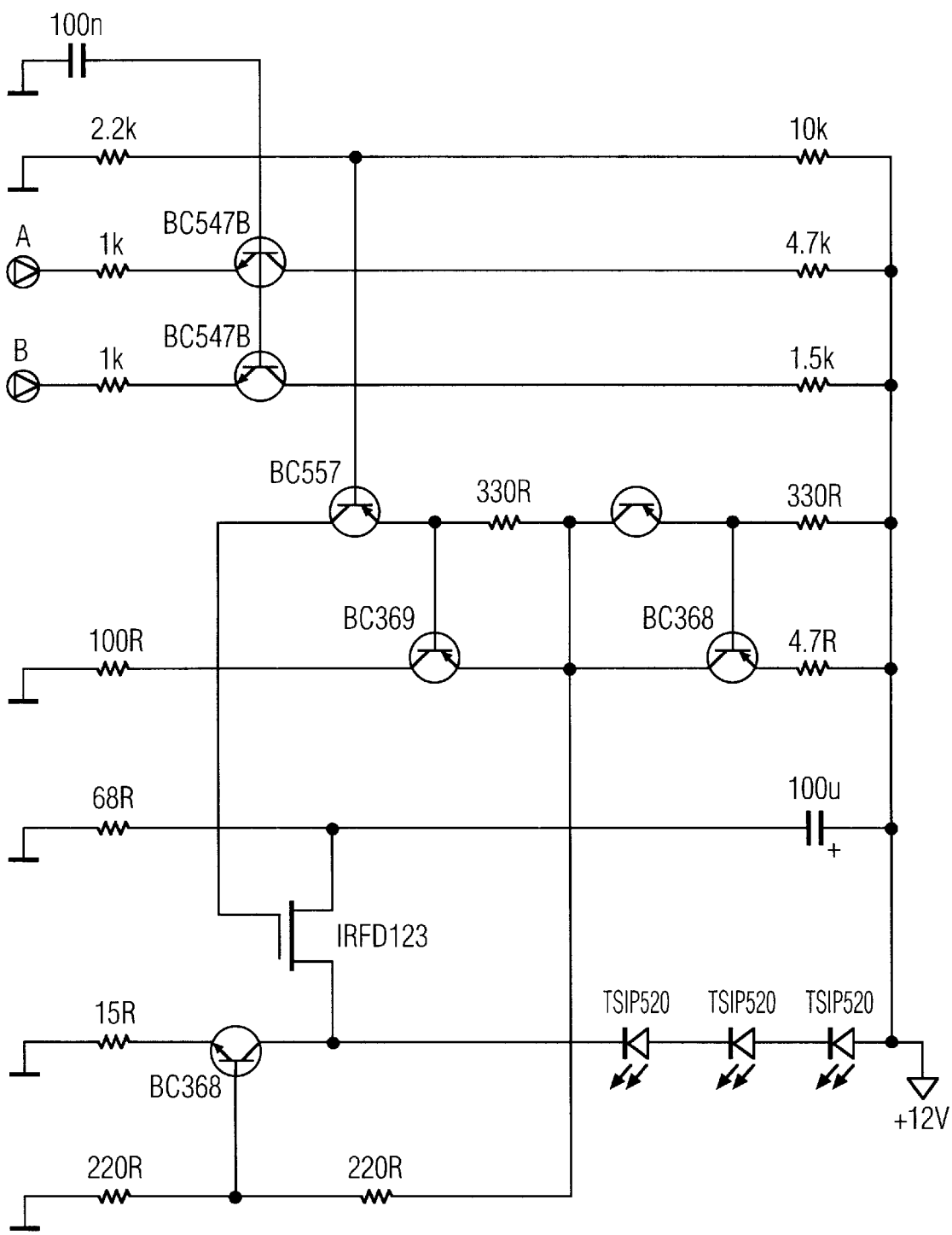
FIG. 2 shows a preferred realization of the embodiment of FIG. 1.

A preferred realization for the embodiment of FIG. 1 is shown in FIG. 2.

Without switching the current I2 the current through the LED remains essentially the same, nearly independent from the carrier frequency. In a version of the above described embodiment the capacitor is charged by the first current source 14, whereby just one current source is needed.

Further versions of the above described embodiment may include at least one of the following variations:

- more than two current sources may be used whereby the value of the current provided to the stage 10 can be better subdivided in dependence on the used carrier frequency;
- the current sources may be able to deliver a variable current and may be controlled by the ECU 18 in dependence on the carrier frequency;
- other radiation emitting means instead of the LED 11 may be used.

In addition it may be mentioned to use the present invention to any transducer, such as

- electrical/electromagnetical embodiments (optical or radio waves);
- electrical/mechanical embodiments (low frequency or ultrasonic waves).

We claim:

1. A method for driving at least one LED by providing a current to said LED which is switched on or off in order to form an optical signal, said optical signal having a specific carrier frequency associated therewith, and wherein the current supplied to said LED has an intensity and a duration dependent on the carrier frequency of the optical signal.

2. The method according to claim 1 wherein the intensity of said current is higher for said optical signal having a higher carrier frequency.

3. The method according to claim 2, wherein the duration of said current is shorter for said optical signal having a higher carrier frequency.

4. The method according to claim 1, wherein the intensity of said current is lower and the duration of said current is longer for said optical signal having a lower carrier frequency.

5. A device for driving at least one LED including:

a current supplying means;

control means for controlling a current from said current supplying means to said LED including switching on and off said current in order to form an optical signal corresponding to one of two or more operational modes associated with said device, wherein for each mode there is assigned a specific carrier frequency of said optical signal, and wherein said current supplied to the LED has an intensity and a duration which depends on the specific carrier frequency indicative of the selected mode.

6. A device according to claim 5, wherein said current supplying means are switched or controlled such that the intensity of said current is higher in a mode with higher carrier frequency of said optical signal.

7. The device according to claim 1, wherein said current supply means are switched or controlled such that the duration of said current is longer in the mode with lower carrier frequency of said optical signal.

8. The device according to claim 5, wherein there are two modes and the carrier frequency is lower than 50 kHz for one mode, and higher than 300 kHz for the other mode.

9. The device according to claim 5 wherein one or more capacitors are used in said current supplying means for supplying said current.

10. A device for driving at least one radiation emitting device comprising:

a current supply means;

control means for controlling a current from said current supply means to said radiation emitting device including switching on and off the current in order to form an optical signal, said optical signal having a specific carrier frequency associated therewith, wherein the current supplied to said radiation emitting device has an intensity and a duration dependent on said specific carrier frequency associated with said optical signal such that for said optical signal having a lower carrier frequency, said current is supplied with a longer duration and lower intensity than that associated with a higher carrier frequency.

* * * * *